March 7, 1944.  C. F. DINLEY  2,343,646
STILL
Filed Sept. 27, 1941
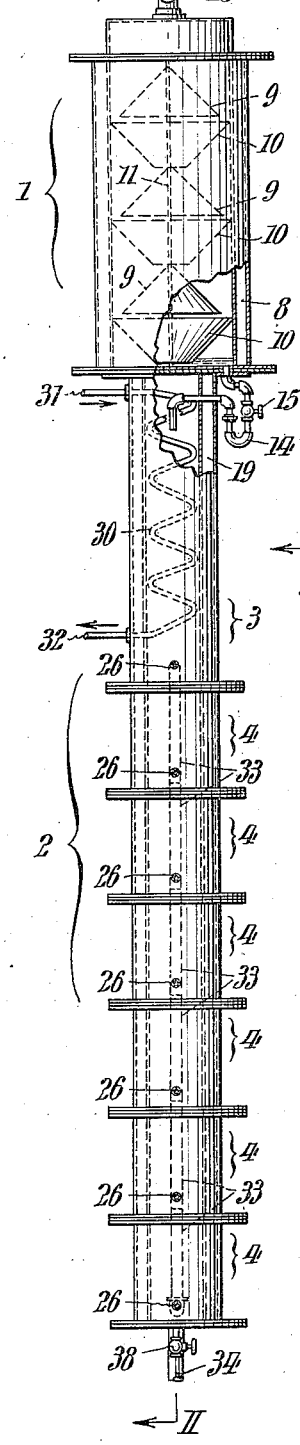
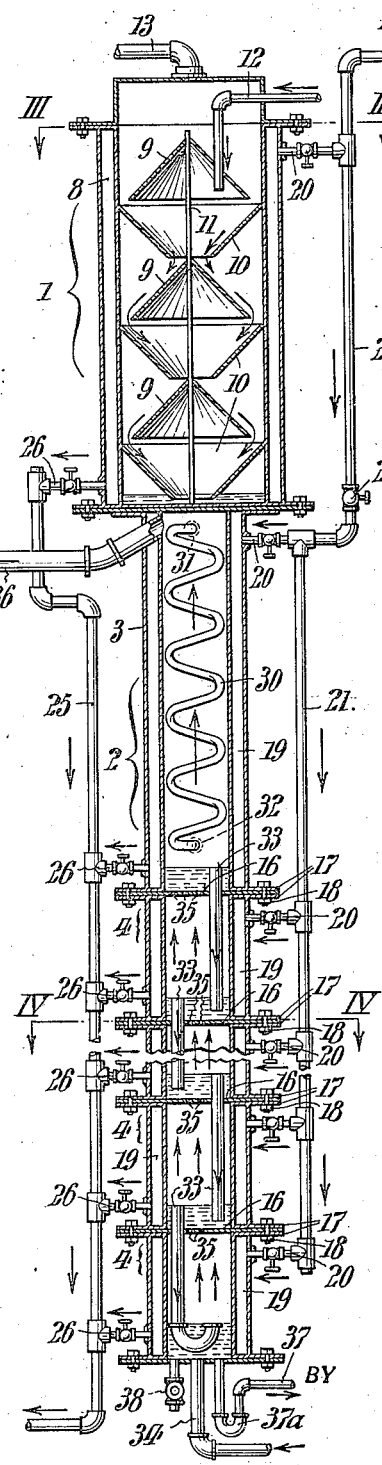
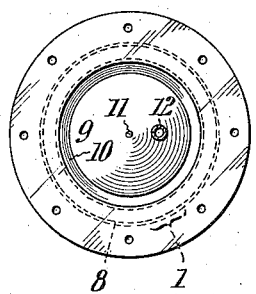
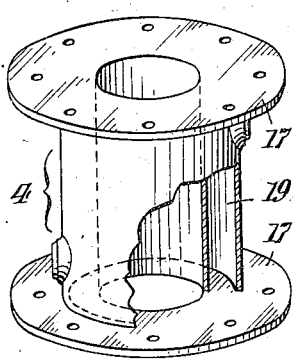
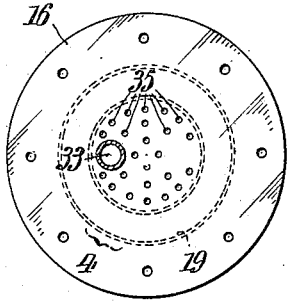
INVENTOR:
Clarence F. Dinley,
BY Paul & Paul
ATTORNEYS.

Patented Mar. 7, 1944

2,343,646

UNITED STATES PATENT OFFICE 2,343,646

STILL

Clarence F. Dinley, Detroit, Mich., assignor to Detroit Rex Products Company, Detroit, Mich., a corporation of Michigan Application September 27, 1941, Serial No. 412,548

8 Claims. (Cl. 202—155)

This invention relates to stills as well as to methods of distillation. More particularly, it is concerned with stills and distilling methods useful in the purification and separation of oils, fats, resins, etc., from the solvents employed to extract such substances from vegetable, animal or other matter or material which may contain or carry them. A typical example which may be mentioned and for which my invention is especially suited as will be readily understood from subsequent disclosure, is in connection with the purification of soya bean oil incident to its separation from solvents such as trichlorethylene in the miscella as the latter is received from apparatus in which extraction is effected.

My invention has for its chief aim to enable the distillation and purification of extracts of the kind referred to, to be effected in a rapid and continuous manner, with incidental separation and reclamation therefrom of the solvent used in the extraction; and avoidance of clogging of the still by solid particles or "fines" carried in the liquid being distilled.

This advantage I realize in practice as hereinafter more fully set forth, through provision of a tower still in which are combined a heated evaporating or flashing section of chamber and a heated stripping section. The miscella or other solvent-oil solution to be treated is first preheated, in accordance with my invention, and then introduced through a small orifice into the evaporating chamber under pressure and at relatively high velocity. The sensible heat released from the liquid as the pressure drops within the evaporating chamber is utilized in evaporating the solvent from the solution. In traversing the evaporating chamber, the liquid is spread in a thin film over an extensive surface area incident to following a devious flow course while subjected to the action of a high temperature, as a consequence of which some further evaporation takes place, so that most of the solvent is driven off as vapor from the solution. After having traversed the evaporating chamber the partially purified liquid is led into the stripper which is composed of a series of sections through which the liquid is passed in succession, and therein subjected to a counter-flowing hot inert gaseous medium such as superheated steam under pressure in progressive stages until all traces of the solvent are eliminated and nothing but the pure oil extract remains.

Other objects and attendant advantages will appear from the following detailed description of the attached drawing, wherein Fig. 1 is a view in vertical elevation of a still conveniently embodying my invention.

Fig. 2 is an axial sectional view of the still, taken as indicated by the angled arrows II—II in Fig. 1.

Figs. 3 and 4 are cross-sectional views, taken as respectively indicated by the angled arrows III—III and IV—IV in Fig. 2; and Fig. 5 is a perspective view of one of the component sections of the stripper.

From these illustrations, it will be observed that my improved still is in the form of a cylindric tower whereof the upper portion 1 which constitutes the evaporating or flashing chamber, is of relatively large diameter, and whereof the lower portion 2 which constitutes the stripper is of smaller diameter throughout and taller, and composed of a series of axially aligned sections or subdivisions 3 and 4. As shown the evaporating chamber 1 is jacketed as at 8 for circulation thereabout of a fluid heating medium such as saturated steam at approximately 260° F. when trichlorethylene is used as the solvent in extracting. Axially arranged in alteration one above the other in the evaporator 1 is a series of upright and invert hollow conical cascade baffles 9 and 10, the upright baffles being supported by a central rod 11 with their peripheral edges clear of the chamber wall, and invert baffles 10 being centrally apertured to clear the rod 11 and having their peripheral edges extending to and supported by said wall. The fluid or miscella to be treated is first preheated beyond its boiling point with the aid of suitable means, not illustrated, and continuously introduced by a pump or the like at pressure of approximately 15 lbs. and at a relatively high velocity into the top of the still through a small orifice pipe 12 which enters the evaporating chamber 1 at one side and has a short downward branch penetrating the uppermost conical baffle 9. The hot liquid so introduced descends in the evaporating chamber and is obliged to follow the circuitous course indicated by the arrows in Fig. 2, falling on the outer and inner surfaces of the successive conical baffles 9 and 10 and being thereby spread out in a thin film over a correspondingly extensive area for action thereupon by high temperature heat transmitted from the jacket 8 through the wall of the chamber 7. Incident to drop of the pressure to that substantially of the atmosphere within the evaporating chamber 1 which has a vapor outlet pipe 13 at the top, the sensible heat released from the liquid immediately reacts effectively upon the latter to evaporate solvent therefrom. By this action and attendant distribution of the liquid over a large area in the evaporating chamber, it will be seen that most of the solvent will be driven off as a vapor in a very rapid and highly efficient manner, together with the vapor of any water which may have been carried along, the temperature of the liquid remaining unaltered. The combined vapors passing upward in the chamber 1 are conducted from the top of the latter by way of the outlet pipe 13 at atmospheric pressure to a suitable condenser and separator (not shown), and are thereby individually recovered.

The partially purified liquid collecting in the bottom of the evaporating chamber 1 is led by way of a fluid trap tube 14 (Fig. 1) and under regulatable control of a hand valve 15, into the uppermost section or chamber 3 of the stripper 2 and dispersed in said section. It will be noted that the section 3, which serves as a foam reducing chamber, is larger (higher) than the other sections 4 below it, which latter as shown, may be all of the same size and capacity. The several stripper chambers are separated from each other by diaphragms 16 interposed between outwardly-projecting opposing circumferential flanges 17 at the corresponding ends of adjacent sections, and are secured together by bolts or rivets 18 passed through registering holes in said flanges. The several stripper sections 3 and 4 are moreover provided with individual jackets 19 for the circulation of steam or other fluid heating medium around them; such medium being supplied to said jackets, as well as to the jacket 8 of the evaporator 1 near their tops, through horizontal branches 20 of a vertical supply main 21. Interposed in this supply main 21 in advance of the still, is a master hand valve 22, and between the evaporator 1 and stripper 2 another hand valve 23. At the opposite side of the still is a vertical exhaust main 25 with lateral branches 26 connecting into the several jackets 19 near their bottoms. The steam pressure and resulting temperature in the jacketing is in practice controlled by a suitable pressure reducing valve (not illustrated) which is adjusted in accordance with the requirements of the particular solvent used in the processing for maintenance of a uniform temperature throughout all the jackets. Disposed axially within the uppermost section or foam reducing chamber 3 of the stripper is a heating coil or preheater 30 whereof the inlet and outlet ends are designated 31 and 32, said coil providing an additional heat exchange surface with which the dispersed liquid contacts for the purpose of breaking up foam generated by the action of the dry superheated steam entering the chamber from below as presently explained, and to accelerate the further elimination of the solvent and water content from the liquid. Such breaking up of foam incident to treatment of oleaginous substances like soya bean oil is highly essential to the successful operation of my improved still. Penetrating the several diaphragms 16 and arranged adjacent opposite sides of the stripper in alternate sections are vertical tubes 33, each of which projects somewhat above the diaphragm through which it passes and terminates somewhat above the diaphragm immediately below. As a consequence, a small but definite quantity of the constantly descending liquid is continuously maintained in the bottom of each stripper chamber, the overflow passing from one section into the next by way of one of the tubes 33. Dry steam or other hot gaseous medium under moderate pressure which will not cause excessive foaming is introduced into the bottom of the lowermost section of the stripper 2 through a pipe 34 and first diffuses upwardly through the lowermost pool and then percolates upwardly through the perforations 35 in the several diaphragms 16. In so doing the steam effectively permeates the temporarily trapped pools of miscella in the bottoms of the several stripper sections. Due to the intimate contact thus brought about between the hot steam and the liquid, any remaining residual solvent and water are likewise driven off in the form of vapors which collect in the uppermost section 3 of the stripper together with those previously driven off in said section, and are conducted from the top of the latter through a conduit 36 to another suitable condenser and separator (not shown) for individual reclamation. Some of the apertures in the respective diaphragms 16 may become temporarily clogged from time to time by small solid particles or fines of the soya bean meal carried along in the miscella, but will be cleared by the action of the dry steam pressure when the clogging persists beyond a certain point. Unprotected apertures are thus used in preference to bubble cap means such as ordinarily employed in stills, and which usually become permanently clogged. The purified liquid extract is drawn from the bottom of the still through a pipe 37 which is formed with a running liquid trap 37a and which may lead to any convenient point of disposal for the extract, and which serves to maintain a definite quantity of liquid in the bottom of the still, i. e., in the lowermost section 4, as shown. By means of the drain cock 38 the still may be cleared from time to time of any refused or solid matter which may accumulate in the lowermost section of the stripper 2 after extensive periods of operation.

From the foregoing it will be apparent that my improved still is not only simple in its construction and reliable in its operation, but extremely flexible in its control and performance, and, moreover, that it serves as a convenient means for carrying out my improved method of distillation.

Having thus described my invention, I claim:

1. In a still for separating volatile solvent from miscella containing soya bean oil or the like, a heated evaporator or flashing chamber; a top outlet through which vapors are free to escape with attendant maintenance of the interior of the evaporator substantially at atmospheric pressure; a restricted orifice through which preheated miscella is introduced into the top of the evaporator under pressure and relatively high velocity; baffle means compelling devious flow of the miscella in a thin film incident to gravitation in the evaporator, whereby, as a consequence of pressure drop and under the latent heat in the miscella, most of the entrained solvent is rapidly driven off in vapor form; a heated stripper beneath the evaporator; fluid sealed passage means by way of which the partially treated miscella is continuously conducted from the bottom of the evaporator into the top of the stripper for dispersion within the latter, said fluid sealed passage means being the only connection means between the evaporator and the stripper; an orifice through which a dry hot inert gaseous medium is introduced under pressure into the bottom of the stripper for upward discharge therein to vaporize any remaining volatiles from the liquid; a separate outlet for the vapors at the top of the stripper; and a fluid seal drain for the purified oil collecting in the bottom of the stripper.

2. A still according to claim 1, in which the evaporator and the stripper are jacketed; and in which fluid heating medium is circulated in the jacketing to maintain a uniform temperature throughout the still.

3. In a still for separating volatile solvent from miscella containing soya bean oil or the like, a heated evaporator or flashing chamber; a top outlet through which vapors are free to escape with attendant maintenance of the interior of the evaporator substantially at atmospheric pressure; a restricted orifice through which preheated miscella is introduced into the top of the evaporator under pressure and at relatively high velocity; baffle means compelling devious flow of the miscella in a thin film incident to gravitation in the evaporator, whereby as a consequence of pressure drop and under the latent heat in the miscella, most of the entrained solvent is rapidly driven off in vapor form; a heated stripper beneath the evaporator including a foam reducing chamber with a superheater therein; means for continuously admitting a hot dry inert gaseous medium under pressure into the bottom of the flashing chamber for upward discharge therein; fluid sealed passage means by way of which the partially treated miscella is continuously conducted from the bottom of the evaporator into the top of the foam reducing chamber for downward dispersion over the superheater and subjection to the counter-flowing gaseous medium, with resultant prevention of foam formation and attendant further elimination of volatiles from the solution, said fluid sealed passage means being the only connection means between the evaporator and the stripper; a separate outlet at the top of the foam reducing chamber for the released vapors; and an outlet for the liquid collecting on the bottom of said chamber.

4. In a still for separating volatile solvent from miscella containing soya bean oil or the like, a heated evaporator or flashing chamber; a top outlet through which vapors are free to escape with attendant maintenance of the interior of the evaporator substantially at atmospheric pressure; a restricted orifice through which preheated miscella is introduced into the top of the evaporator under pressure and at relatively high velocity; baffle means compelling devious flow of the miscella in a devious course incident to gravitation in the evaporator, whereby, as a consequence of pressure drop and under the latent heat in the miscella, the entrained solvent is rapidly driven off in vapor form; a heated stripper beneath the evaporator including a chamber with a superheater therein; a subjacent auxiliary chamber; a perforated diaphragm separating the auxiliary chamber from the foam reducing chamber; stand-pipe means for trapping and holding a small quantity of the solution respectively in the bottoms of the foam reducing and auxiliary chamber; means for continuously admitting a dry hot inert gaseous medium under pressure into the bottom of the auxiliary chamber for diffusion upwardly through the solution temporarily trapped in the bottom thereof, and after having traversed said chamber, to percolate upwardly by way of the perforations in the diaphragm through the temporarily trapped liquid in the foam reducing chamber; fluid sealed passage means by way of which the solution is continuously conducted from the bottom of the evaporator into the top of the flashing chamber for downward dispersion over the superheater and subjection to the hot counter-flowing gaseous medium with resultant prevention of foam formation and attendant further elimination of volatiles, said fluid sealed passage means being the only connection means between the evaporator and the stripper; a separate outlet at the top of the foam reducing chamber for the released vapors; and a drain outlet for the purified oil collecting in the bottom of the auxiliary chamber.

5. A still according to claim 4, in which the evaporator and the foam reducing and auxiliary chambers of the stripper are all jacketed; and in which a fluent heating medium is circulated in the jacketing to maintain a uniform temperature throughout the still.

6. A still according to claim 4, in which several additional heated chambers are interposed between the foam reducing chamber and the auxiliary chamber, each such additional chamber being separated from its immediate neighbors by perforated diaphragms and provided with stand-pipe means for continuously trapping descending liquid in their bottoms for upward percolation therethrough of the hot gaseous medium from below.

7. A still for separating volatile solvent from miscella containing soya bean oil or the like, according to claim 4, in which the evaporator, the foam reducing, the auxiliary, and the additional chambers of the stripper are all jacketed; and in which a fluent heating medium is circulated in the jacketing to maintain a uniform temperature throughout the still.

8. In a still for separating volatile solvent from miscella containing soya bean oil or the like in solution, a heated evaporator or flashing chamber; means for introducing preheated miscella into the chamber under pressure above atmospheric and at a relatively high velocity; means within the chamber for dispersing the miscella so introduced into a thin descending film to allow free evaporation of the solvent from the miscella under the latent heat of the latter substantially at atmospheric pressure; an outlet for escape of the released vapors from the top of the chamber; a heated stripper disposed beneath the chamber and having a clear space at its top; fluid sealed passage means by way of which the partially treated miscella is continuously conducted from the bottom of the flashing chamber into a clear space in the top of the stripper for descent therein in the form of a stream, said fluid sealed passage means being the only connection means between the evaporator and the stripper; means for introducing a hot dry inert gaseous stripping medium under pressure into the bottom of the stripper to flow upwardly therein or counter to the descending stream of the partially treated miscella in the clear space aforesaid; a separate outlet for the vapors displaced from the solution in the stripper; and a liquid sealed drain for the purified oil collecting in the bottom of said stripper.

CLARENCE F. DINLEY.